250
United States Patent Office 2,868,552
Patented Jan. 13, 1959

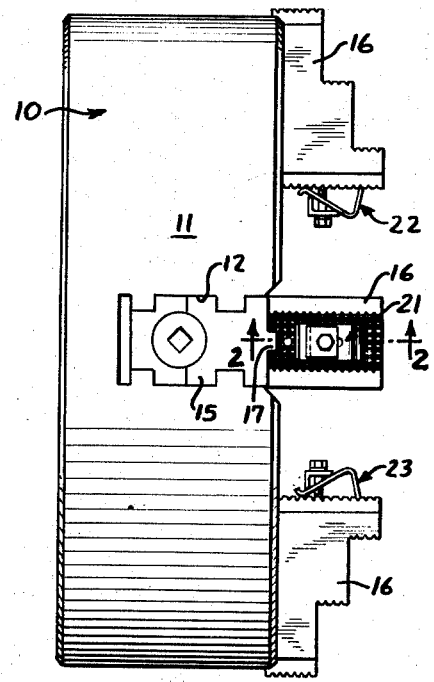
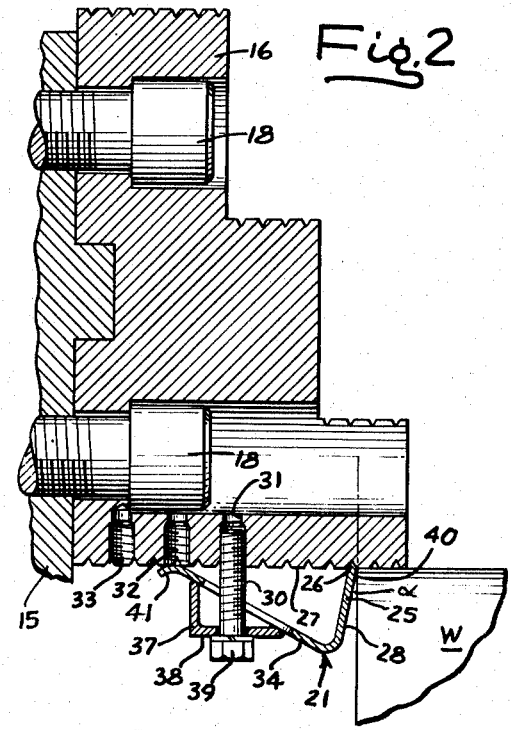
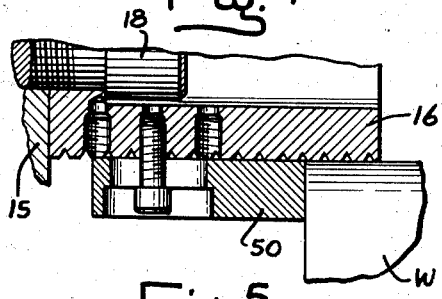
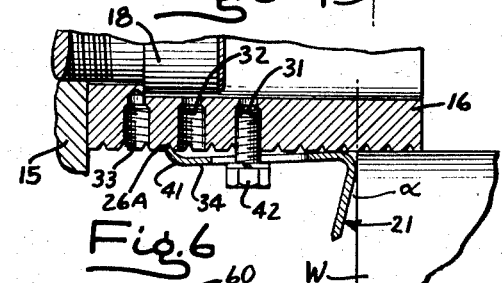
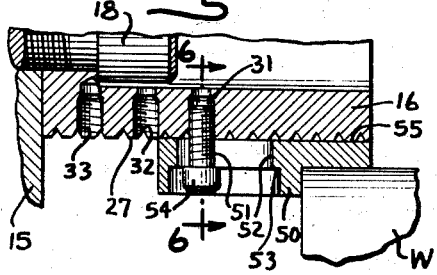
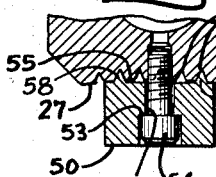

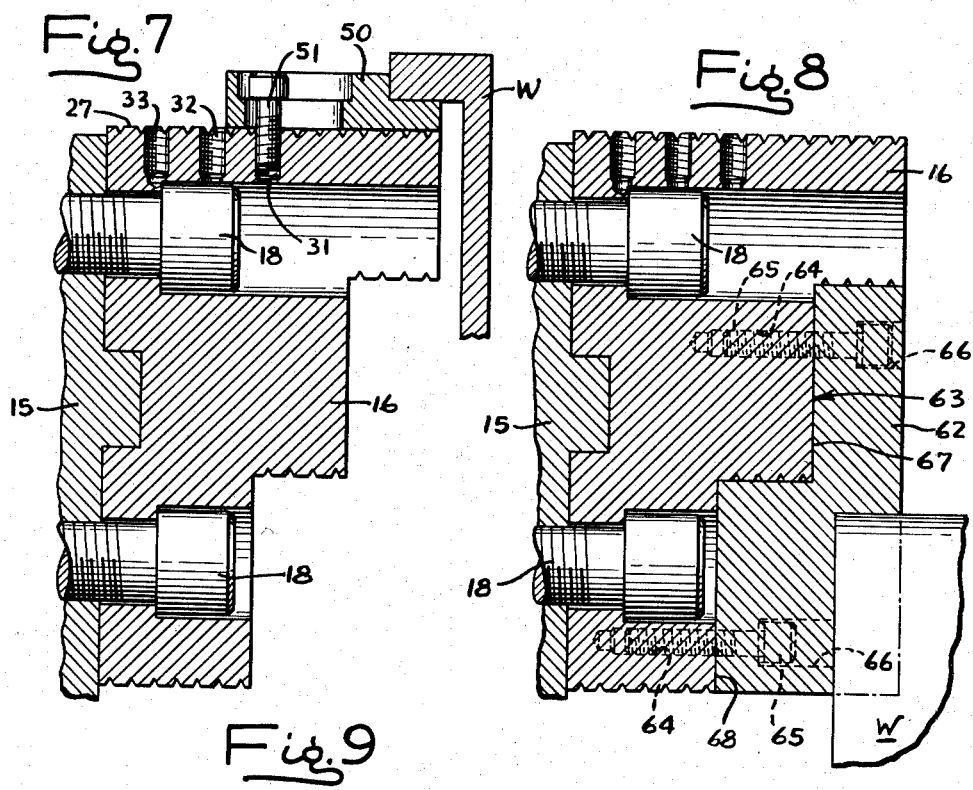
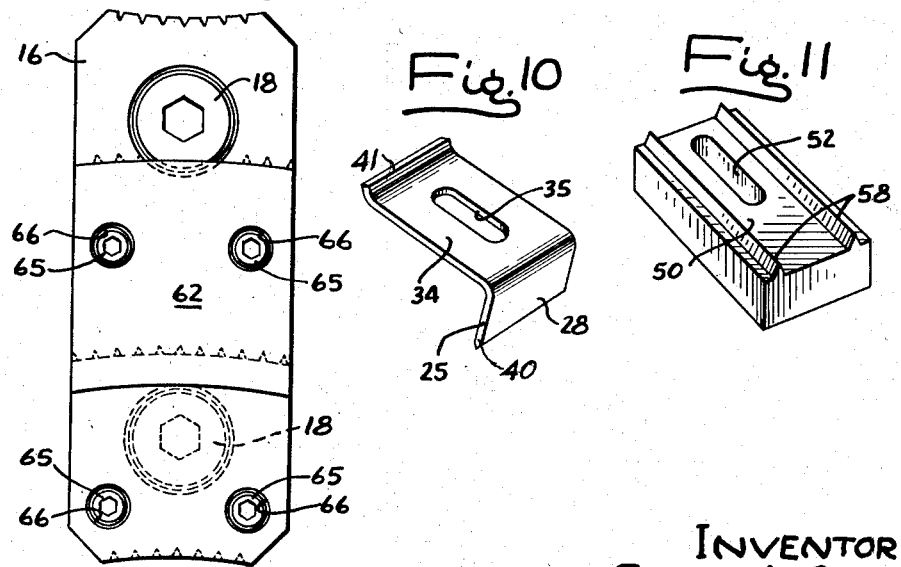

2,868,552

ADJUSTABLE CHUCK WORK STOPS

Frank A. Cihak, La Grange, Ill.

Application February 13, 1958, Serial No. 715,126

17 Claims. (Cl. 279—123)

This invention pertains generally to apparatus for supporting a workpiece for machining and more specifically to improved means for mounting work within the jaws of a lathe chuck. It finds particular but by no means exclusive utility when embodied in a lathe chuck where the latter is to be used for holding duplicate pieces for small quantity production as in the ordinary run of work in a machine job shop.

One object of the invention is to provide adjustable work positioning stops for locating duplicate pieces of work in the same location in the jaws of a lathe chuck, which offer reasonable precision in locating work for small quantity jobs and reduce set-up time, and require minimum modification of present standard chucking equipment so as to adapt it for receiving the stops.

A further object of the invention is to provide work positioning stops particularly adapted for endwise positioning of first operation work held in standard hardened chuck jaws, which stops are adapted to be fastened on the serrated gripping surfaces of the jaws. A related object is to provide for graduated adjustment of the work positioning stops along the length of the serrated gripping surface.

It is an other object of the invention to provide for accurately holding second operation work in standard hardened chuck jaws, making it unnecessary to employ the relatively expensive soft jaws which are normally used to hold such work. A related object of the invention is to provide readily machinable stop pads which are constructed to be fastened with ease and convenience on the opposed gripping surfaces of standard hardened jaws, and may be turned, bored or otherwise machined to the form of the piece for gripping the same, being relatively inexpensive so that they may be discarded after use on a job.

It is another object of the invention to offer increased safety of operation since the work positioning stops of the invention, when mounted on the jaws, do not impair the balance of the chuck and are locked to the jaws so as not to be thrown off at higher speeds.

A further object of the invention is to provide means facilitating the holding of work in a lathe chuck which has great practical utility, permitting the lathe chuck to be set up for holding widely diverse types of workpieces in standard hardened jaws for both first and second operations, including workpieces of irregular or awkward shape, and by dispensing with the necessity of making or purchasing special jaws or fixtures, allowing substantial reductions in machining costs.

Other objects will be apparent from the following description taken in connection with the accompanying drawings, wherein:

Figure 1 is a view in side elevation of a standard lathe chuck embodying this invention and having the top jaw on this side of the chuck removed so that the work positioning stop on the opposite jaw may be seen;

Fig. 2 is a sectional view of a top jaw mounted on the chuck of Figure 1 and the work positioning stop carried thereon, taken in the plane defined substantially by the lines 2—2 in Figure 1;

Fig. 3 is a fragmentary sectional view showing the work positioning stop of Figures 1 and 2, reversed for adjustment purposes;

Fig. 4 is a fragmentary sectional view of a chuck jaw carrying a stop pad, which is a modified form of work positioning stop embodying the invention;

Fig. 5 is a fragmentary sectional view showing a chuck jaw and work positioning stop of the stop pad form wherein the stop pad is machined to grip a workpiece;

Fig. 6 is a fragmentary sectional view taken in the plane defined substantially by the lines 6—6 of Fig. 5;

Fig. 7 is a sectional view showing the top jaw reversed and a work positioning stop of the stop pad form as shown in Figs. 4 and 5, machined for gripping a piece of work on the inside;

Fig. 8 is a sectional view of a top jaw carrying a work positioning stop of a further modified form embodying the invention;

Fig. 9 is a front view of a jaw having a work positioning stop as shown in Fig. 8;

Fig. 10 is a perspective view of the work positioning stop shown in Figs. 1–3; and Fig. 11 is a perspective view of the work positioning stop of the stop pad shown in Figs. 4–7 looking at the bottom of the element.

While the invention is susceptible of various modifications and alternative constructions, illustrative forms of the invention have been shown in the drawings and will be described in considerable detail. It should be understood, however, that there is no intention to limit the invention to the forms disclosed, on the contrary, the intention is to cover all modifications, alternative constructions and equivalents falling within the spirit and scope of the invention as expressed in the appended claims.

Referring to the drawings, for illustrative purposes the invention is shown in Figure 1 embodied in a four jaw lathe chuck 10 for general use on turret lathes, although this is illustrative only, since the invention has widespread application in connection with the holding and positioning of small parts for machining purposes. A lathe chuck of the type shown has either an iron or steel body 11 which is provided with radial slots 12 in which either solid jaws or two piece jaws may be mounted for adjustment radially so as to accommodate work having different diameters. For illustrative purposes a chuck has been shown with two piece jaws, wherein bottom or master jaws 15 fit in the slots 12 and support top jaws 16, which are removable and reversible and are located by a tongue 17 in the bottom or master jaws and held in place by the screws 18, as shown. Lathe chucks having this construction may be made where the jaws are adjusted independently of each other, or are adjusted together, and after such adjustments have been made to grip a piece, the scroll or universal mechanism is used for clamping. The use of this invention is not limited to either type of chuck, but it has universal application to these as well as other forms of work holding mechanisms.

As illustrated in Figure 1, the chuck 10 is furnished with hardened step jaws 16 customarily used for the majority of turret lathe work. For convenience, the top jaw 16 on this side of the chuck 10 has been removed so that the opposite jaw may be seen.

In small quantity production of duplicate parts, particularly for first operations, it is often necessary to position each piece W of material endwise at the same location in the chuck. In accordance with the present invention, for this purpose a set of work positioning stops 21—23 are provided one for each jaw 16, each stop being fastened on the opposed gripping surfaces of the jaws and extending for engagement with the piece W. In the present instance, the work positioning stops on each jaw have the same construction and it will be understood that the following description of one stop applies to all stops of a set. As shown in Figs. 2 and 10, the work positioning stop 21 is made of a relatively rigid material such as spring steel formed into a V-shaped element which is adapted to be fastened on the gripping surface of the jaws 16. As illustrated in these figures, the arrangement is such that the forward, shorter leg 25 of the V is engaged in a lateral serration 26 of the jaw surface 27 so as to present the outer side 28 of that leg as an outwardly extending abutment which engages the piece W and positions the same endwise of the gripping surface of the jaw. With this arrangement, the side by side lateral serrulations 26 are used to establish the endwise location of the stop 21, and to fix this location the stop is rigidly fastened to the jaw 16 by means of a fastening element which in the present case comprises a screw-threaded fastener 30 such as a machine screw received in a tapped hole 31 in the gripping surface of the jaw. So as to allow graduated adjustment of the stop 21 throughout substantially the full length of the gripping surface 27, the gripping surface is provided with a plurality of tapped holes 31—33, which in this case include three equally spaced, and the other leg 34 of the V is slotted lengthwise 35 so as to allow adjustment or movement of the stop the full distance between the tapped holes. In the position of the stop shown in Fig. 2, the screw-threaded fastener 30 clamps the stop by means of an angle bracket 37 which compensates for the slope of the leg 34 of the stop and presents a flat surface 38 to the head 39 of the screw, although it will be understood the specific fastening means shown is exemplary only.

In keeping with the present invention, the side by side lateral serrations 26 provide for graduated adjustment of the location of the stop 21 substantially the full length of the jaw surface 27. As will be readily evident, the end 40 which may be somewhat wedge-shaped, of the forward leg 25 of the V-shaped element forming the body of the stop, when moved from serration to serration in the jaw surface shifts the position (defined by the plane P) established by the stop for the workpiece W by the full pitch of the serrations 26.

It is another feature of this invention that the forward leg 25 of the stop, which extends outwardly from the gripping surface of the jaw when the stop is fastened thereon, is flat and lies disposed slightly inclined to a plane normal to the axis of the chuck. It is preferred that the outer surface 28 of the work positioning stop be inclined slightly so that a piece W contacted by this surface as the jaws are adjusted radially inwardly to grip the piece, is forced toward the front of the chuck to its final position. Thus, as shown in Fig. 2, the outer or abutment surface 28 lies at a relatively small angle α relative to the plane P defining the final location for the workpiece W, and which for convenience may be designated as the abutment plane.

Another feature of the present invention is that the stops 21 illustrated in Figures 1 and 2, may be reversed top for bottom so as to produce a change in the axial location of the abutment plane P corresponding to half the pitch of the serrations 26. In this manner, by moving the stops 21 endwise and reversing the same, they provide graduated half pitch adjustment of the abutment plane for a substantial part of the length of the gripping surfaces of the jaws. The foregoing is accomplished in the present instance by making the trailing leg 34 of the V element such that it is flattened outwardly at the end 41. Accordingly, having this form, when the V element is reversed top for bottom, the same may be fastened on the serrated gripping surface 27 of the jaw 16 by a machine screw 42 and without the use of an angle bracket, as shown in Fig. 3, with the flattened end 41 engaged in a lateral serration 26-A on the jaw surface. When in this position, as shown in Fig. 3, the abutment plane P lies shifted from the position shown in Fig. 2 about half the distance between the crests of the serrations 26. In order to produce this positioning of the abutment plane P, however, it is also required that the length of the stop 21, in other words, the effective distance between the positioning ends 40, 41, on the V element, be such that reversing the stop produces the half pitch change in the axial location of the abutment plane P as hereinbefore described.

When reversed, as in Fig. 3, the stop 21 is adapted for fastening the chuck jaw 16 by means of the same tapped holes 31—33 in the gripping surface and a machine screw 42. Since the other leg 34 of the V element, when the stop is reversed, is positioned substantially flat and adjacent to the gripping surface, the need for an angle bracket for supporting the threaded fastener is dispensed with and the fastener may be connected directly to the element extending through the slot 35 in the same and into one of the tapped holes in the gripping surface. When the screw-threaded fastener 42 is threaded into place it draws the body of the stop 21 tightly against the gripping surface, the serrations 26 then preventing cocking or relative turning of the V element, making for a more rigid arrangement.

In the reversed position of the stop 21 as depicted in Fig. 3, the outer surface 28 is inclined slightly to a plane perpendicular to the chuck axis. A piece W contacted by this surface 28 as the jaws 16 are adjusted radially inwardly to grip the piece is thus wedged to its final position in the abutment plane P.

One of the well-known disadvantages of conventional chuck back stops, which may be bolted on the face of the jaws, or sometimes are so made as to be held in T-slots in the face of the jaws, is that they may be thrown off at high speeds, which is unsafe and presents risk of injuring the operator of the machine. The possibility of damage to the machine itself with such chuck back stops is also an important consideration. Furthermore, conventional stops are relatively heavy and can seriously unbalance the chuck unless they are accurately positioned. Because of these disadvantages conventional chuck back stops have found only limited use, although the need for a safe arrangement to carry out the positioning function has been long recognized. It will be readily evident that the present work positioning stop invention overcomes these disadvantages since the positioning means are rigidly fastened to the jaws so as to fully eliminate the possibility of throwing them off and offering complete safety in the operation of the machine. The work positioning stops are relatively light and are inherently balanced as they are positioned on the same or corresponding gripping surfaces of the jaws. Moreover, conventional chuck stops are relatively expensive in and of themselves, and the mounting therefor on the chuck bodies is also an expensive procedure. It will be evident that the present stops are relatively inexpensive to manufacture and yet provide reasonably precise graduated adjustment for work positioning purposes. Furthermore, the chuck bodies require no modification to receive the chucks, and the hard chuck jaws require only the modification of having tapped holes provided in the same to receive and position and fasten the stops to them. Accordingly, the present invention offers an inexpensive method of endwise positioning of a workpiece within the jaws of the chuck, and particularly in first operation work which is ordinarily done in hardened jaws offers a reasonably accurate positioning means requiring very little set-up time to install.

While hardened stepped top jaws 16 of the type shown on the chuck 10 in Figure 1, are ordinarily used for gripping the piece W in roughing operations, or first operations, in second operation work where accurate finishing is required, according to conventional practice the hardened step jaws 16 are replaced with soft jaws (not shown) usually of the same general dimensions as the hardened step jaws, which soft jaws are turned or bored for holding work. It will be readily evident that the foregoing is expensive both in terms of time for machining the soft jaws, and in terms of special equipment since each set of soft jaws must be re-machined to hold a different piece of work. The latter is a particularly important consideration in small quantity production as is the normal type of job in a machine job shop.

In accordance with the present invention, means are provided for accurately holding second operation work in standard hardened chuck jaws, thus dispensing with the usual soft jaws, in the present case comprising, as shown in Figs. 4–7 and 11, a set of stop pads, one for each hardened jaw of the lathe chuck. It is preferred that each stop pad 50 comprise a readily machinable material which is adapted to be machined to the form of the piece W to grip the latter by adjustment of the chuck jaws. In carrying out the foregoing, such a stop pad 50 may take the form where it comprises a substantially rectangular block of readily machinable material such as aluminum, of a length comparable to the length of the gripping surface 27 of the chuck jaw 16, and of a width and thickness such as to present sufficient machinable material for holding several different jobs. In the present instance, it is contemplated that the stop pad 50 may be extruded aluminum and may be fastened on the gripping surface 27 by means of a screw-threaded fastener, for example, an Allen screw 51 passing through a slot 52 in the block and received in one of a series of tapped holes 31—33 in the gripping surface. The slot 52 in this case is made with a shoulder 53 for the head 54 of the screw 51.

To prevent cocking of the stop pad 50, the under surface 55 of the same engaging the gripping surface 27 on the jaw 16 may be provided with longitudinal positioning lands 58 which are parallel and adapted to fit in spaced longitudinal serrations 60 (Fig. 6) in the serrated gripping surface. In cooperation with the screw-threaded fastener 51, the serrations 60 and positioning lands 58 on the stop pad 50 assist in anchoring the pad more securely against movement, prevent skewing of the stop pads 50, and effectively hold the latter against accidental dislodgement.

As will be seen in Figs. 5 and 7, such stop pads may be readily bored (Fig. 5) or turned (Fig. 7) to the form of the piece W, and in second operation work may be used to grip the piece accurately, without marring it as would the serrated gripping surfaces of the hardened jaws if they were used alone to grip the piece. The bodies of the stop pads 50 are made sufficiently long and thick so as to be machinable for holding different size pieces. Thus the stop pads may be used for holding several different pieces and when the material has been substantially all cut away, the stop pads may be discarded.

Referring particularly to Fig. 7, it will be seen that with the present invention the stop pads 50 may be employed for holding work W by the inside, and in this case, the hardened step jaws 16 have been reversed placing the stop pads on the outside of the chuck jaws rather than on the inside, and presenting the same for engagement with the inside of the work.

In accordance with a further form of the invention, work positioning means are provided for a lathe chuck so as to permit the holding of work, particularly of awkward or irregular shape, although this same means may be fixed for holding regular pieces, also. For this purpose, referring to Figs. 8 and 9, it is contemplated that work positioning stops in the form of stop pads 62 of machinable material and having a stepped shape so as to be carried on the jaw faces of hardened stepped jaws, may be used.

Accordingly, it will be seen that in this form of the invention the stop pads 62 are made of stepped form complementary to the stepped faces 63 of the hardened chuck jaws 16. Furthermore, the faces 63 of the hardened jaws are provided with tapped holes 64 for the receipt of screw-threaded fasteners 65 which inserted in countersunk holes 66 in the pads, may be used to fasten the same against the face of the jaw.

In the present instance, it is contemplated that the stepped pads 62 may be made of soft machinable metal, such as aluminum, which will allow trueing up of the pads while in place of the chuck jaws to receive a workpiece W as illustrated in Fig. 8. In this manner also, the endwise position of the piece W may be adjusted with precision and the piece may be held for first or second operations. Moreover, it is also a feature of this form of the invention, that work of irregular or awkward shapes may be held within the chuck jaws with rigidity and accuracy. It will be understood, therefore, that the stepped pads may be milled, for example, to fit the work and then attached to the hardened chuck jaws. Accordingly, when the nature of the job and the shape of the workpiece permits, relatively expensive special jaws or fixtures which have been required heretofore, may be replaced by the machinable pads 62, resulting in a substantial reduction in the cost of manufacture of such work.

As will be evident, the modification of a standard chuck jaw that is required to accommodate the same to receive the stepped pads 62 of this invention, in this case comprises the drilling and tapping of the four holes 64 spaced as shown in Fig. 9 so as not to interfere with the openings in the hardened jaws to receive the screws 18 fastening them on the master or bottom jaws. In the present case, it is proposed to employ a pair of such tapped holes 64 in each of two faces 67, 68 of the jaws, for fastening the pad 62 in place. It will also be evident that this mounting arrangement offers the same factors of safety which have been described in connection with the stops shown in Figs. 1–7 since the stop pads when fastened on the jaws are inherently balanced, and are relatively light. Being inexpensive to make, the same may be discarded after use for several jobs, thus reducing the problem of storage of soft jaws which have been machined or turned a number of times, limiting their use at that point to holding large work. As will be observed, the stepped pads 62 are also usable for holding work by the inside, being machinable while in place on the hardened stepped jaws or on another machine to the form of the work so as to grip the latter.

An important feature of this invention is that for second operation work, in setting up the chucking lathe at least one whole operation has been eliminated, namely, replacing the hardened jaws with soft jaws which have to be machined to fit the work. With this invention the work positioning stops may be installed on the chuck jaws without removing the hard jaws from the chuck and when machinable stops are used, under most circumstances the latter may be machined while mounted on the hardened stepped jaws. When irregular work is involved and it is necessary to mill the pad to fit the piece, due to the convenience with which the pads may be installed, less set-up time is required than to fit ordinary soft jaws to the work.

I claim as my invention:

1. In a lathe chuck having radially adjustable jaws, said jaws having opposed gripping surfaces, means for positioning a piece in the chuck comprising a set of stops one for each jaw, each stop including an element adapted to be fastened on the gripping surfaces of the corresponding jaws and extending outwardly for engagement with the piece, and means for fastening each stop element rigidly on the jaw so that the elements are held against dislodgement.

2. In a lathe chuck having radially adjustable jaws, said jaws having opposed serrated gripping surfaces, means for positioning a piece in the chuck comprising a set of stops one for each jaw, each stop including an element having a portion for fitting between serrulations in the gripping surface of the corresponding jaw and extending outwardly therefrom for engagement with the piece, and means for fastening said stop elements tightly against the gripping surfaces of the jaws, so that the serrulations in the gripping surfaces in cooperation with the fastening means holds the elements against dislodgement.

3. In a lathe chuck having radially adjustable gripping jaws, means for positioning and holding a workpiece in the chuck including a set of stop pads one for each jaw each comprising a readily machinable material adapted to be machined to the form of the piece to grip the latter by adjustment of the chuck jaws.

4. In a lathe chuck having radially adjustable jaws, said jaws having opposed gripping surfaces, a set of stop pads one for each jaw for holding a piece in the chuck, and means for fastening said stop pads rigidly on said gripping surfaces, said stop pads each comprising a readily machinable material adapted to be machined to the form of the piece to grip the latter by radial adjustment of the chuck jaws.

5. In a lathe chuck having radially adjustable jaws, said jaws having opposed gripping surfaces, means for positioning a workpiece in the chuck comprising a set of stops one for each jaw, each stop including an element adapted to be carried on the gripping surfaces of the corresponding jaws and having a portion extending outwardly therefrom for engagement with a workpiece upon radial adjustment of the jaws toward the workpiece, and means for fastening said stop elements rigidly on the jaws so that the elements are held against dislodgement comprising screw-threaded fasteners connected respectively to said stop elements, said jaws having tapped holes for receiving said fasteners.

6. In a lathe chuck having radially adjustable jaws, said jaws having opposed gripping surfaces, a set of stop pads one for each jaw for holding a piece in the chuck, means for fastening said stop pads rigidly on said gripping surfaces, said stop pads each comprising a readily machinable material adapted to be machined to the form of the piece to grip the latter by radial adjustment of the chuck jaws, said means for fastening said stop pads on the jaws comprising screw-threaded fasteners connected respectively to said stop pads, said jaws having tapped holes for receiving said fasteners.

7. In a lathe chuck having radially adjustable jaws, said jaws having stepped faces presenting a succession of opposed gripping surfaces, a set of stops one for each jaw for holding a piece in the chuck, each stop including an element of stepped shape complementary to the jaws and adapted to be fastened on the faces thereof, said elements extending outwardly from the gripping surfaces of the jaws for engagement with the workpiece, said elements each comprising a readily machinable material adapted to be machined to the form of the piece to grip the latter by radial adjustment of the chuck jaws, and means for fastening said stop elements to the jaws.

8. In a lathe chuck having radially adjustable jaws, said jaws having opposed serrated gripping surfaces with lengthwise serrulations, means for positioning and holding a workpiece in the chuck including a set of stops one for each jaw, each stop including an element fitting against the serrated gripping surface of the corresponding jaw and having a portion adapted to extend between adjacent serrulations, said elements each comprising a readily machinable material adapted to be machined to the form of the piece to grip the latter by adjustment of the chuck jaws, and means for drawing said elements tightly against the gripping surfaces of the jaws and fastening the same thereto, so that the elements are held against cocking by the fastening means in cooperation with the serrulations in said gripping surfaces.

9. In a lathe chuck having radially adjustable jaws, said jaws having opposed serrated gripping surfaces with cross serrulations, a set of stops one for each jaw for endwise positioning of a piece in the work, each stop comprising an element adapted to be carried on the serrated gripping surface of the corresponding jaw and having a portion adapted to extend between serrulations and a portion presented as an abutment to the piece, and means for drawing said elements tightly against the jaws, so that the elements are held against cocking and the position thereof is established by the serrulations.

10. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck, each stop comprising an element adapted to be fastened on the gripping surface of the corresponding jaw and having a positioning edge engageable between serrulations in the jaw surface to establish the location of the stop, each said stop element presenting an abutment to the piece disposed in a plane substantially at right angles to the axis of the chuck, the serrulations providing for graduated adjustment of the location of the abutment plane, and means for fastening the stop elements on the gripping surfaces of the jaws.

11. In a lathe chuck having radially adjustable jaws to adapt the chuck for holding pieces of different sizes, said jaws having opposed serrated gripping surfaces with side by side cross serrulations, a set of stops one for each jaw for endwise positioning of a piece of work in the chuck, each stop including an element adapted to be fastened on the gripping surface of the corresponding jaw and having a positioning edge engageable between said serrulations in the jaw surface to establish the location of the stop, each said stop element presenting an abutment to the piece disposed in a plane substantially at right angles to the axis of the chuck, the cross serrulations providing for graduated adjustment of the location of the abutment plane, and means for fastening each element tightly against the gripping surface of the jaw, including a screw-threaded fastener connected to the stop element, said gripping surfaces of the jaws having spaced tapped holes for the reception of said fastener.

12. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck jaws, each stop comprising a body of a V shape adapted to be fastened on the gripping surface of the corresponding jaw with one leg of the V engaged between lateral serrulations in the jaw surface so as to present the outer side of said one leg of the V as an abutment to the piece disposed in a plane substantially at right angles to the axis of the chuck, the cross serrulations providing for graduated adjustment of the location of the abutment plane by the full pitch of the serrulations.

13. In a lathe chuck having radially adjustable jaws presenting gripping surfaces to adapt the chuck for holding pieces of different sizes, said jaws presenting opposed serrated gripping surfaces having side by side cross serrulations, a set of stops one for each jaw for endwise positioning of a piece of work in the chuck, each stop comprising a body of a V shape adapted to be fastened on the gripping surface of the corresponding jaw and having a positioning edge engageable between cross serrulations in the jaw surface to establish the location of the stop such that it presents the outer side of one leg of the V as an abutment to the piece disposed in a plane substantially at right angles to the axis of the chuck, the cross serrulations providing for graduated adjustment of the location of the abutment plane by the full pitch of the serrulations.

14. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck, each stop comprising an element adapted to be fastened on the gripping surface of the corresponding jaw and having opposite and longitudinally spaced positioning edges alternately engageable upon reversing the element between cross serrulations in the jaw surface to establish the location of the stop, each said stop element presenting when fastened to the jaw an abutment to the piece disposed in a plane substantially at right angles to the axis of the chuck, the positioning edges being so spaced longitudinally that reversing the stop element produces a change in the location of the abutment plane corresponding to half the pitch of the serrulations, so that the stops provide graduated half-pitch adjustment of the abutment plane for a substantial part of the length of the gripping surfaces of the jaws.

15. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck, each stop comprising a body of a V shape adapted to be fastened on the gripping surface of the corresponding jaw with one leg of the V engaged between cross serrulations in the jaw surface so as to present the outer side of said leg as an abutment to the piece disposed in a plane substantially at right angles to the axis of the chuck, the end of the other leg of the V being flattened outwardly so that reversing the body top for bottom adapts the same for fastening on the serrated gripping surface of the jaw with the said end of the other leg of the V engaged between cross serrulations in the jaw surface so as to present the same outer side of the first leg as an abutment to the piece in a plane substantially at right angles to the axis of the chuck, the ends of the V being so longitudinally spaced that reversing the stop produces a change in the axial location of the abutment plane corresponding to half the pitch of the serrulations so that the stops provide graduated half-pitch adjustment of the abutment plane for a substantial part of the length of the gripping surface of the jaws.

16. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck jaws, each stop comprising an element adapted to be fastened on the gripping surface of the corresponding jaw, said element having a positioning edge for engagement between cross serrulations in the jaw surface and one surface which is presented as a slightly inclined abutment to the piece, said inclination being at a relatively small acute angle relative to a plane perpendicular to the axis of the chuck such that a piece contacted by the abutment surface as the jaws are adjusted radially inwardly is forced toward the front of the chuck.

17. In a lathe chuck having radially adjustable jaws to adapt the chuck for holding pieces of different sizes, said jaws presenting opposed serrated gripping surfaces having side by side cross serrulations, a set of stops one for each jaw for endwise positioning of a piece of work in the chuck, each stop comprising a body of a V shape adapted to be fastened on the gripping surface of the corresponding jaw with one leg of the V engaged between serrulations in the jaw surface so as to present the outer side of said leg as a slightly inclined abutment to the piece, said inclination being at a relatively small angle relative to a plane perpendicular to the axis of the chuck such that a piece contacted by the abutment as the jaws are adjusted radially inwardly is forced toward the front of the chuck, the end of the other leg of the V being flattened outwardly and the included angle between the legs being such that reversing the body top for bottom adapts the same for fastening on the serrated gripping surface of the jaw with the said end of the other leg of the V engaged between serrulations in the jaw surface and the same outer side of the first leg presented as an abutment to the piece at the same inclination angle, the ends of the V being so longitudinally spaced that reversing the stop produces a change in the axial location of the abutment corresponding to half the pitch of the serrulations so that the stops provide graduated half-pitch adjustment of the abutment for a substantial part of the length of the gripping surface of the jaws.

References Cited in the file of this patent

UNITED STATES PATENTS

| | | |
|---|---|---|
| 221,746 | Skinner | Nov. 18, 1879 |
| 1,161,490 | McKinney | Nov. 23, 1915 |
| 2,045,487 | Oslind | June 23, 1936 |
| 2,488,822 | McDonald | Nov. 22, 1949 |